(12) United States Patent
Liao

(10) Patent No.: US 6,318,823 B1
(45) Date of Patent: Nov. 20, 2001

(54) COMPUTER ENCLOSURE INCORPORATING A PIVOTABLE DRIVE BRACKET

(75) Inventor: Nien Chiang Liao, Lu-Chou (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/474,870

(22) Filed: Dec. 29, 1999

(30) Foreign Application Priority Data

Aug. 3, 1999 (TW) .............................. 88213093 U

(51) Int. Cl.[7] .................................................. A47B 88/00
(52) U.S. Cl. .................... 312/223.2; 312/322.1; 361/683; 361/725
(58) Field of Search .............. 312/223.2, 223.1, 312/322.1, 265.5, 257.1, 325, 327, 263, 270.2; 361/725, 752, 796, 801, 683, 685, 686, 723, 727

(56) References Cited

U.S. PATENT DOCUMENTS

| | | | | |
|---|---|---|---|---|
| 5,745,342 | * | 4/1998 | Jeffries et al. | 361/683 |
| 5,774,337 | * | 6/1998 | Lee et al. | 361/725 |
| 5,940,265 | * | 8/1999 | Ho | 312/223.2 X |
| 5,995,363 | * | 11/1999 | Wu | 312/223.2 X |
| 5,995,364 | * | 11/1999 | McAnally et al. | 361/685 |
| 6,000,767 | * | 12/1999 | Liu et al. | 312/223.2 |
| 6,102,500 | * | 8/2000 | Chen | 312/223.2 |

* cited by examiner

Primary Examiner—Peter M. Cuomo
Assistant Examiner—Michael J. Fisher
(74) Attorney, Agent, or Firm—Wei Te Chung

(57) ABSTRACT

A computer enclosure includes a cage and a drive bracket received in the cage. The cage includes a front panel defining an opening, a beam connected to the front panel for abutment of the drive bracket and a latch attached to the beam. A pair of flanges extends from opposite edges of the opening and defines a pair of pivoting holes. The drive bracket includes a pair of pivoting tabs for extending into the pivoting holes of the cage and a fixing portion engaging with the latch of the cage.

12 Claims, 9 Drawing Sheets

COMPUTER ENCLOSURE INCORPORATING A PIVOTABLE DRIVE BRACKET

BACKGROUND OF THE INVENTION

1. Field of the Invention

The present invention relates to a computer enclosure, and particularly to a computer enclosure incorporating a pivotable drive bracket.

2. Description of the Prior Art

Miniaturization of computers requires full use to be made of internal space in a computer enclosure.

A conventional fixing drive bracket received in the computer enclosure needs extra internal space for assembling an electronic device thereto and complicates the assembling procedure. To save space, a pivotable drive bracket is incorporated in the computer enclosure, such as that disclosed in Taiwan patent application No. 85209373.

Referring to FIGS. 1–3, a computer enclosure 100 includes a pair of fixing plates 102 and a pivotable drive bracket 104 attached between the fixing plates 102. The pivotable drive bracket 104 forms a pair of side flanges 106 extending from opposite side edges thereof and a pair of bottom flanges 108 extending from opposite edges of a bottom surface thereof. Each side flange 106 forms a protrusion 110 for extension through a hole 112 defined in the fixing plate 102a bolt 114 is attached to the protrusion 110, thereby allowing the side flange 106 to pivot about the hole 112. Each bottom flange 108 defines an aperture 116 for extension of a bolt 118 therethrough to fix the drive bracket 104. However, since the drive bracket 104 is attached by bolts 114, 118, assembly of the drive bracket 104 is complicated.

SUMMARY OF THE INVENTION

Accordingly, an object of the present invention is to provide a computer enclosure having a latch for facilitating attachment of a pivotable drive bracket to the enclosure.

To fulfill the foregoing object of the present invention, a computer enclosure comprises a cage and a drive bracket received in the cage. The cage includes a pair of flanges defining a pair of pivoting holes, a beam for abutment of the drive bracket and a latch attached to the beam. The drive bracket includes a pair of pivoting tabs for extending into the pivoting holes of the cage and a fixing portion engaging with the latch of the cage.

BRIEF DESCRIPTION OF THE DRAWINGS

Other objects and advantages of the present invention will be understood from the following description of a computer enclosure according to a preferred embodiment of the present invention shown in the accompanying drawings, in which:

FIG. 4A is an enlarged perspective view of the fixing portion of FIG. 4.

FIG. 4B is an enlarged perspective view of the flange of FIG. 4.

DETAILED DESCRIPTION OF THE PREFERRED EMBODIMENT

Figure 1:
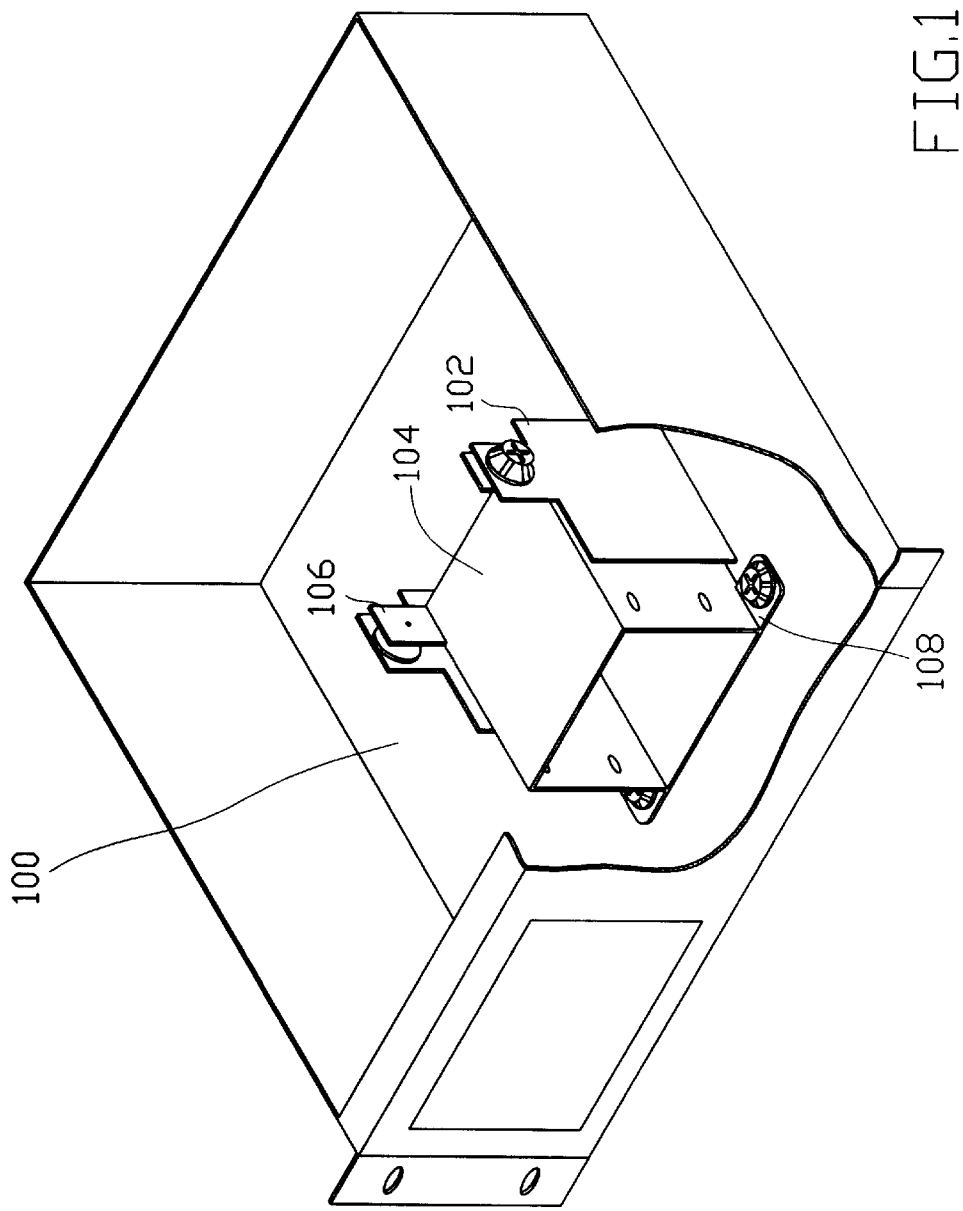
FIG. 1 is an assembled view of a conventional computer enclosure with a portion thereof cut away.
Figure 2:
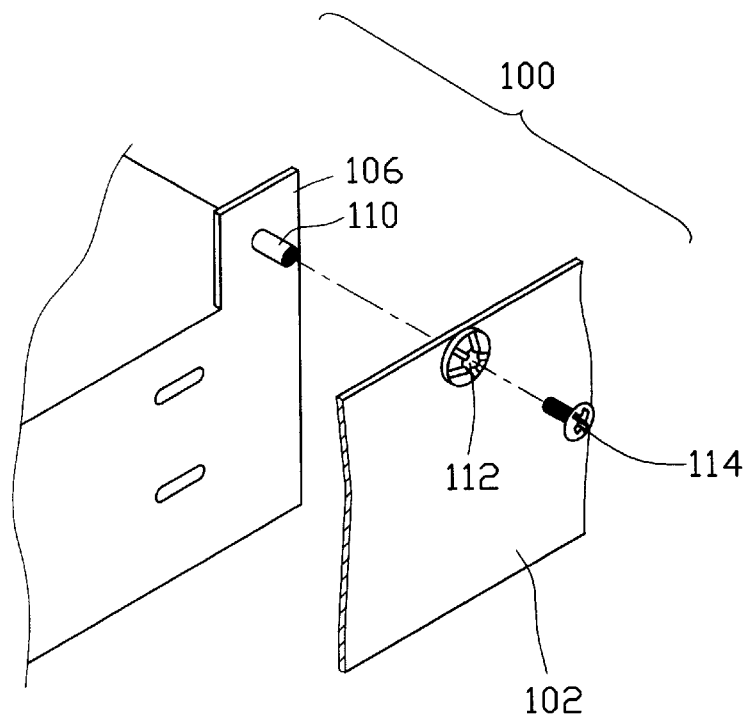
FIG. 2 is a fragmentary exploded view of FIG. 1.
Figure 3:
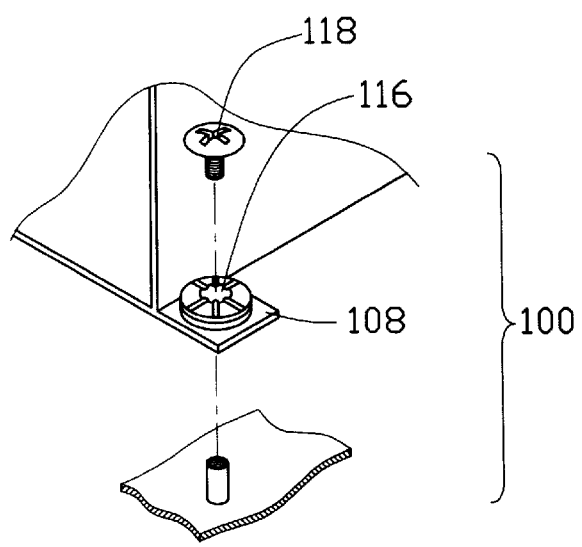
FIG. 3 is a fragmentary exploded view of FIG. 1.
Figure 4:
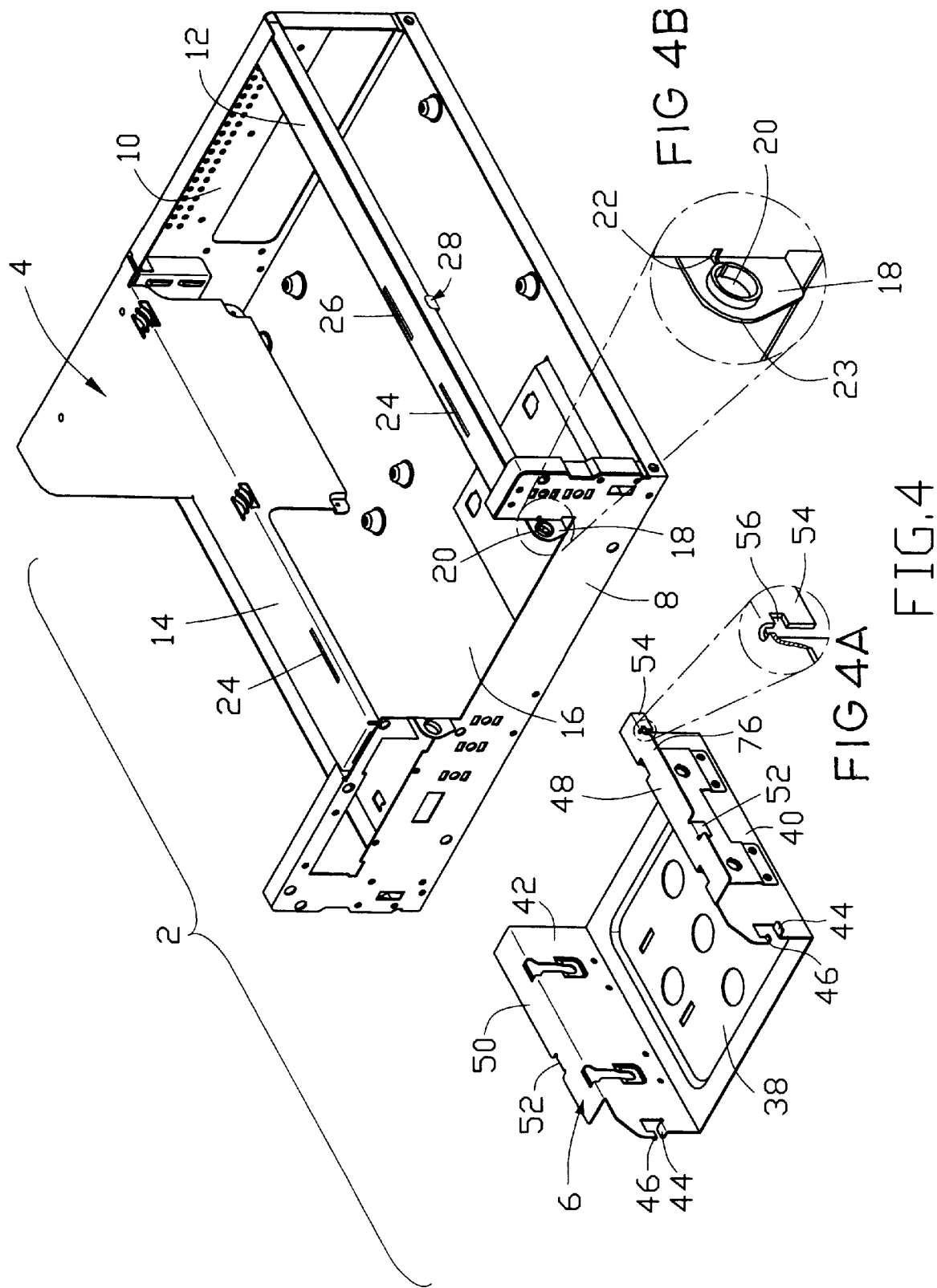
FIG. 4 is an exploded view of a computer enclosure embodying the concepts of the present invention.
Figure 5:
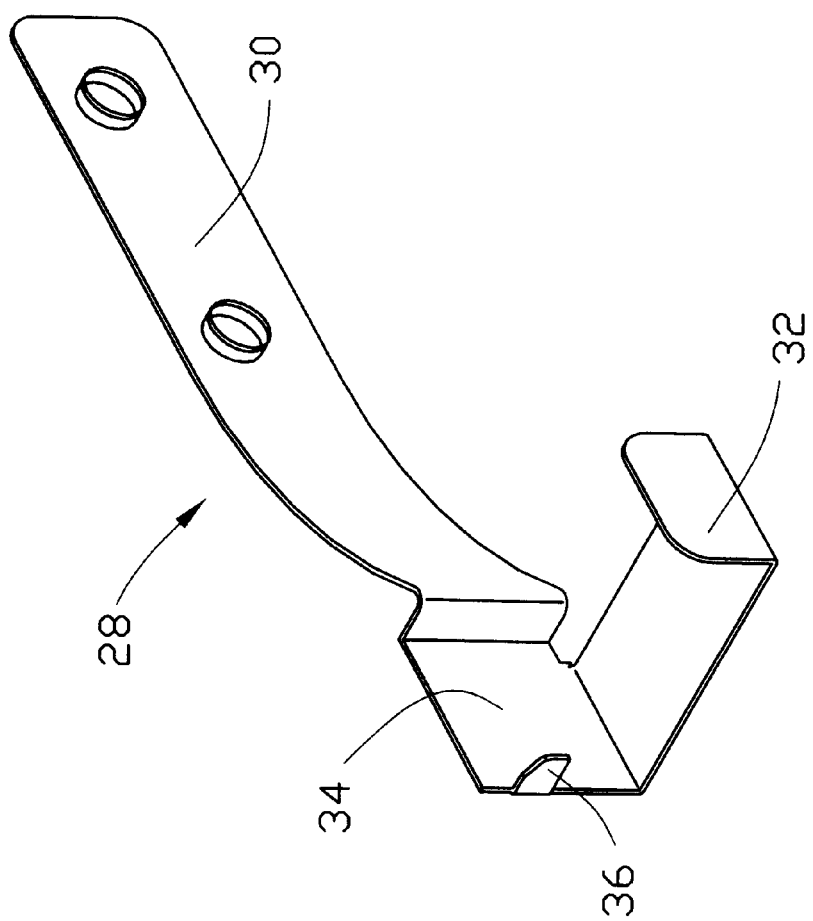
FIG. 5 is a perspective view of a latch of the present invention.
Figure 6:
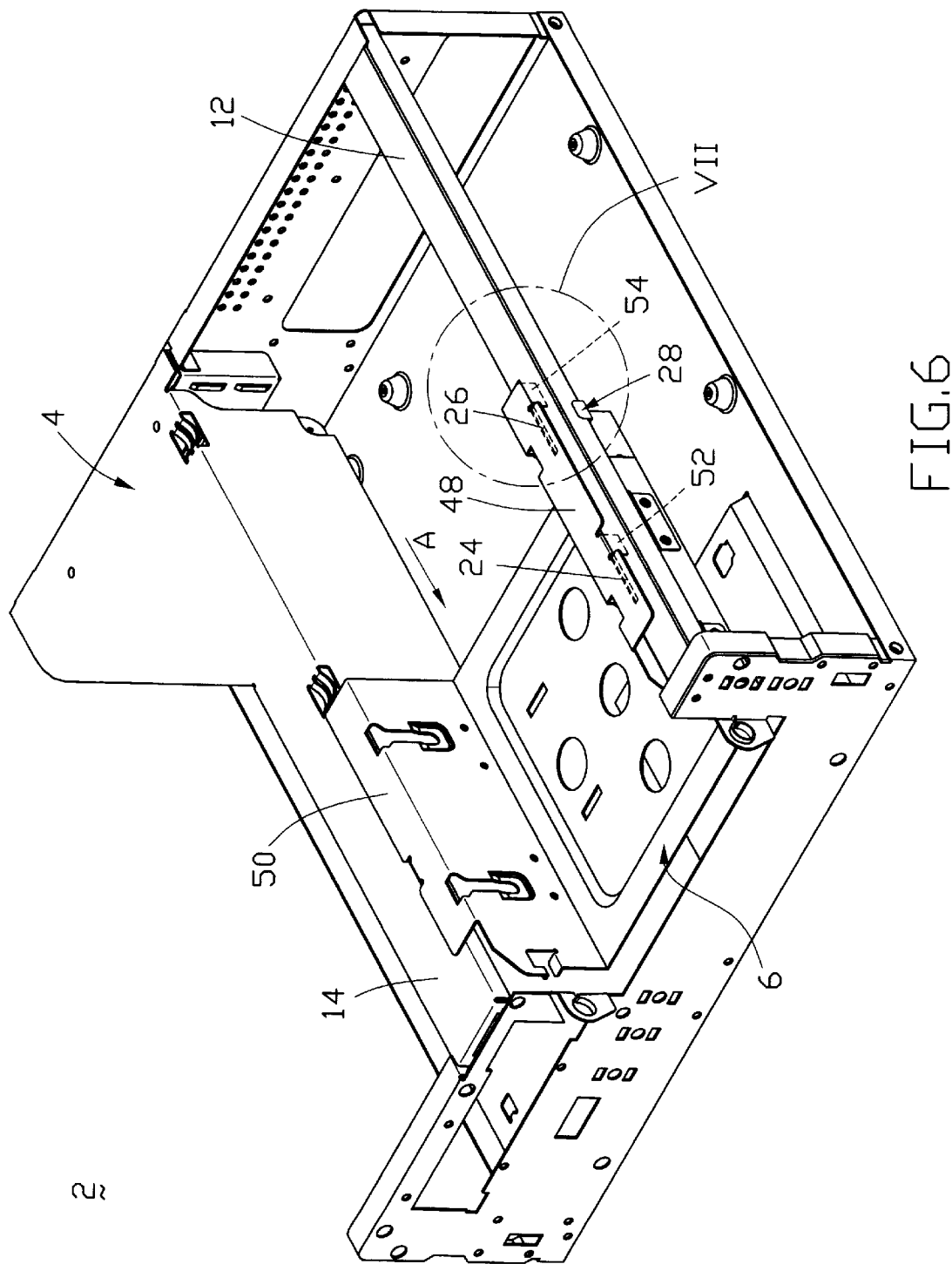
FIG. 6 is a partially assembled view of the computer enclosure of FIG. 4 showing the drive bracket assembled to the cage.
Figure 7:
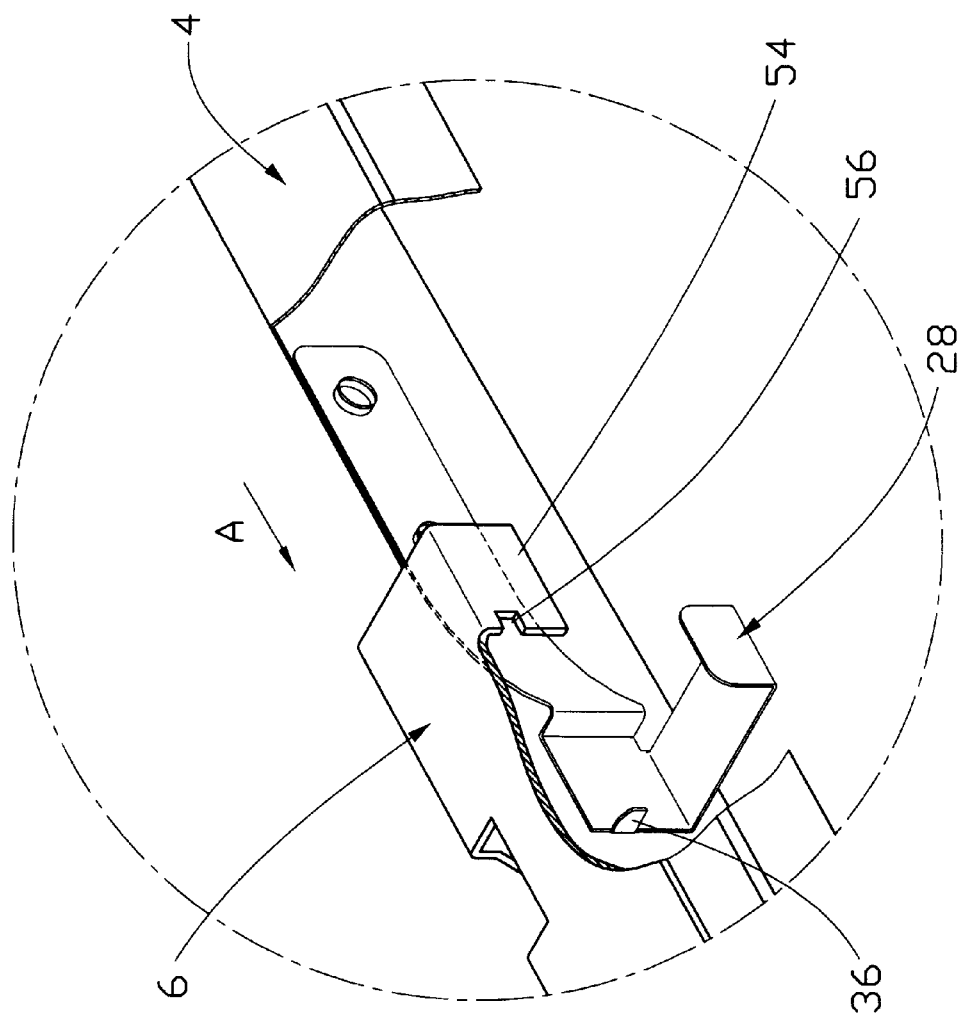
FIG. 7 is an enlarged cross-sectional view of the encircled portion VII of FIG. 6.
Figure 8:
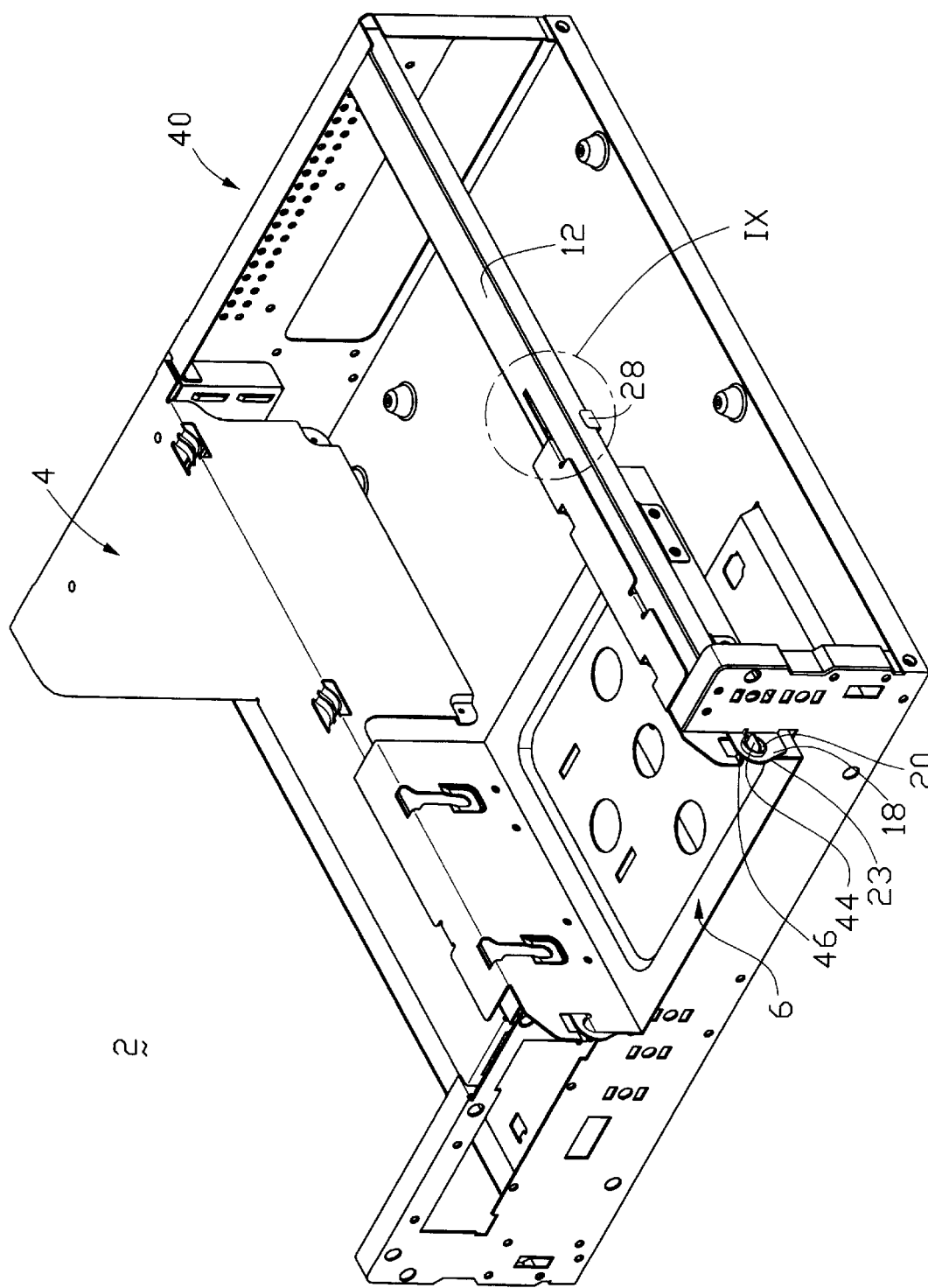
FIG. 8 is an assembled view of FIG. 4.

Referring to FIGS. 4, 4A, 4B and 5, a computer enclosure 2 in accordance with the present invention comprises a cage 4 and a pivotable drive bracket 6 mounting on the cage 4. The cage 4 includes a front panel 8, a rear panel 10, a beam 12 and a bridge 14. The beam 12 and the bridge 14 are both connected between the front and rear panels 8, 10 for receiving the drive bracket 6 therebetween. The front panel 8 defines an opening 16 between the beam 12 and the bridge 14. A pair of flanges 18 extends from opposite edges of the opening 16. Each flange 18 defines a pivoting hole 20 and a guiding aperture 22 in communication to the pivoting hole 20 and the opening 16. An arcuate edge 23 is formed around each flange 18. A pair of guiding slots 24 is respectively defined in the beam 12 and the bridge 14. The beam 12 defines a fixing slot 26 aligned to the guiding slot 24 thereof. A latch 28 attached to the beam 12 (see FIG. 7) includes an attaching portion 30, a press portion 32 and a body portion 34 connected between the attaching portion 30 and the press portion 32. A fixing tab 36 extends from a front edge of the body portion 34 toward the press portion 32.

The drive bracket 6 includes a base portion 38, and first and second side walls 40, 42 perpendicularly extending from opposite edges of the base portion 38. A pair of pivoting tabs 44 and guiding tabs 46 are respectively formed at ends of the side walls 40, 42. A first step 48 and a second step 50 respectively extend from the first and second side walls 40, 42 for respectively abutting against the beam 12 and the bridge 14 of the cage 4. A pair of positioning tabs 52 is respectively formed at the first and second steps 48, 50 for insertion into the guiding slots 24 of the cage 4. A fixing portion 54 is formed at the first step 48 for insertion into the fixing slot 26 of the cage 4. A cutout 56 is defined in the fixing portion 54 for receiving the fixing tab 36 of the latch 28.

Referring to FIGS. 6–9, in assembly, the drive bracket 6 is received between the beam 12 and the bridge 14 of the cage 4. The first and second steps 48, 50 of the drive bracket 6 respectively abut against the beam 12 and the bridge 14 of the cage 4. The positioning tabs 52 of the drive bracket 6 extend into the guiding slots 24 of the cage 4. The fixing portion 54 of the drive bracket 6 extends into the fixing slot 26 of the cage 4. Then the drive bracket 6 is moved along direction A to pivot about the pivoting hole 20 of the cage 4. The pivoting tabs 44 of the drive bracket 6 extend through the guiding apertures 22 and are received in the pivoting holes 20 of the cage 4. The guiding tabs 46 of the drive bracket 6 abut against the arcuate edges 23 of the flanges 18 of the cage 4. The cutout 56 of the fixing portion 54 of the drive bracket 6 engages with the fixing tab 36 of the latch 28 thereby fixing the drive bracket 6 at the cage 4. Thus, the drive bracket 6 is easily assembled in the cage 4.

Figure 9:
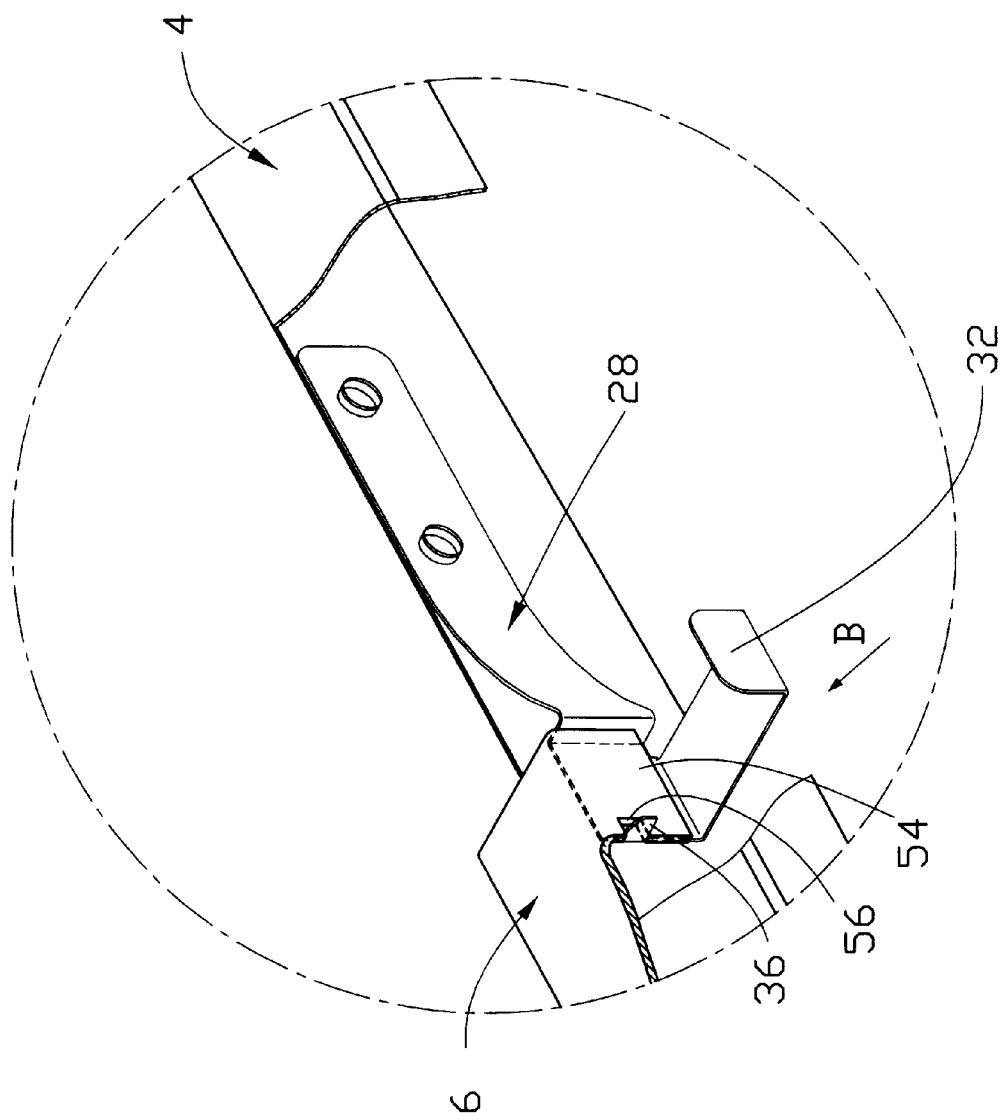
FIG. 9 is an enlarged cross-sectional view of the encircled portion IX of FIG. 8 showing the drive bracket engaging with the latch.
Figure 10:
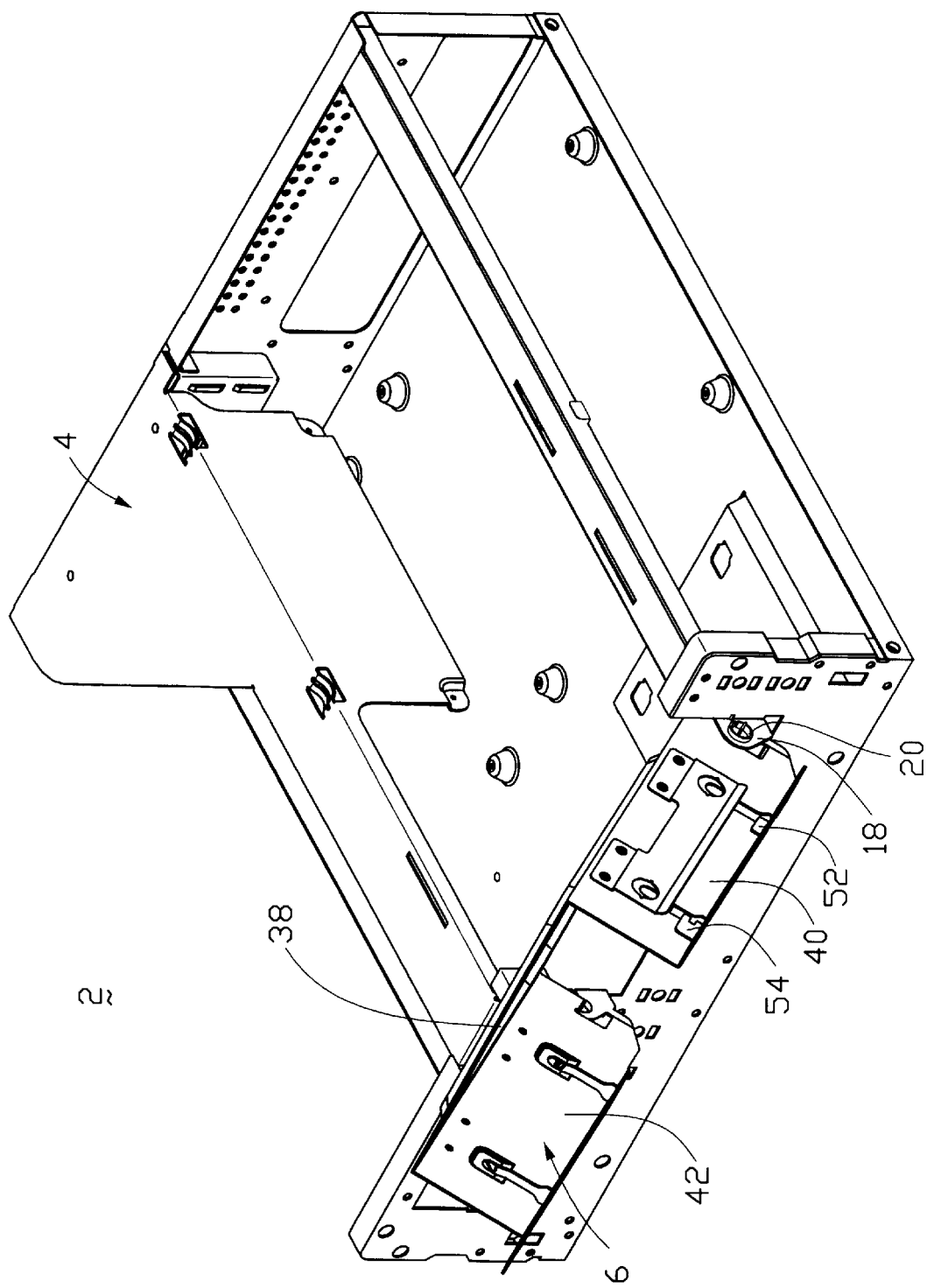
FIG. 10 is a perspective view of the computer enclosure showing the drive bracket pivoting about the cage.

Referring to FIGS. 9 and 10, when the press portion 32 of the latch 28 is pressed and moved along direction B until the fixing tab 36 thereof detaches from the cutout 56 of the fixing portion 54, the drive bracket 6 is pivotable about the pivoting holes 20 of the flanges 18 of the cage 4.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:

a cage including a pair of flanges defining a pair of pivoting holes, a beam and a latch attached to the beam; and a drive bracket received in the cage and abutting against the beam, the drive bracket including a pair of pivoting tabs pivotally engaged with the pivoting holes of the cage and a fixing portion engaged with the latch to thereby fix the drive bracket to the cage, the drive bracket being upwardly pivotable about the pivoting tabs upon pressing the press portion to disengage the latch from the fixing portion.

2. The computer enclosure as described in claim 1, wherein each flange defines a guiding aperture in communication to a corresponding pivoting hole thereof for guiding the pivoting tabs of the drive bracket to extend into the pivoting holes.

3. The computer enclosure as described in claim 1, wherein each flange forms an arcuate edge, and wherein the drive bracket forms a pair of guiding tabs adjacent to the pivoting tabs for abutting against corresponding arcuate edges.

4. The computer enclosure as described in claim 1, wherein the beam defines a fixing slot for extension of the fixing portion of the drive bracket.

5. The computer enclosure as described in claim 1, wherein the latch includes an attaching portion, a press portion and a body portion connected between the attaching portion and the press portion.

6. The computer enclosure as described in claim 5, wherein a fixing tab extends from a front edge of the body portion toward the press portion, and wherein the fixing portion of the drive bracket defines a cutout for receiving the fixing tab.

7. The computer enclosure as described in claim 1, wherein the cage includes a front panel defining an opening, and wherein the beam is connected to the front panel and the flanges extend from opposite edges of the opening.

8. The computer enclosure as described in claim 7, wherein a first guiding slot is defined in the beam, and wherein the drive bracket forms a first positioning tab for insertion into the guiding slot.

9. The computer enclosure as described in claim 5, wherein a bridge is attached to the front panel, and the drive bracket is received between the bridge and the beam.

10. The computer enclosure as described in claim 9, wherein a second guiding slot is defined in the bridge, and wherein the drive bracket forms a second positioning tab for extension into the second guiding slot.

11. A computer enclosure assembly comprising:

a cage including a beam and a bridge commonly defining a space therebetween;

a panel defining an opening between said beam and said bridge;

a drive bracket pivotally attached around said opening and received within said space, the drive bracket having a pair of steps seated on said beam and said bridge, respectively;

a deflectable latch formed on one of said beam and said bridge; and a fixing portion formed on one of said pair of steps and latchably engaged with said latch.

12. The computer enclosure as described in claim 11, wherein guiding slots and positioning tabs are respectively formed on the flange and the step, and engaged with each other for assuring true position of the drive bracket in the cage.

* * * * *